United States Patent
Nara

(10) Patent No.: US 7,555,175 B2
(45) Date of Patent: Jun. 30, 2009

(54) ARRAYED WAVEGUIDE GRATING OPTICAL MULTIPLEXER/DEMULTIPLEXER

(75) Inventor: Kazutaka Nara, Tokyo (JP)

(73) Assignee: The Furukawa Electric Co., Ltd, Tokyo (JP)

(*) Notice: Subject to any disclaimer, the term of this patent is extended or adjusted under 35 U.S.C. 154(b) by 0 days.

(21) Appl. No.: 11/844,762

(22) Filed: Aug. 24, 2007

(65) Prior Publication Data
US 2008/0131053 A1   Jun. 5, 2008

(30) Foreign Application Priority Data
Aug. 31, 2006   (JP)   .............................. 2006-234969

(51) Int. Cl.
*G02B 6/12*   (2006.01)
(52) U.S. Cl. .......................................... 385/14; 385/37
(58) Field of Classification Search ....................... None
See application file for complete search history.

(56) References Cited

U.S. PATENT DOCUMENTS

| | | |
|---|---|---|
| 6,442,314 B2 | 8/2002 | Nara et al. |
| 6,445,853 B1 | 9/2002 | Kashihara et al. |
| 6,490,395 B1 | 12/2002 | Nara et al. |
| 6,501,882 B2 | 12/2002 | Kashihara et al. |
| 6,563,986 B2 | 5/2003 | Kashihara et al. |
| 6,567,587 B2 | 5/2003 | Kashihara et al. |
| 6,668,116 B2 | 12/2003 | Kashihara et al. |
| 6,671,433 B2 | 12/2003 | Kashihara et al. |
| 6,728,435 B2 | 4/2004 | Kashihara et al. |
| 6,735,364 B2 | 5/2004 | Kashihara et al. |
| 6,768,832 B2 | 7/2004 | Nakajima et al. |
| 6,768,840 B2 | 7/2004 | Nara et al. |
| 6,816,651 B2 | 11/2004 | Kashihara et al. |
| 6,836,591 B2 | 12/2004 | Kashihara et al. |
| 6,920,265 B2 | 7/2005 | Kashihara et al. |
| 7,072,545 B2 | 7/2006 | Nara et al. |
| 7,133,587 B2 | 11/2006 | Nara et al. |
| 2002/0085808 A1 | 7/2002 | Ooyama et al. |
| 2002/0154861 A1 | 10/2002 | Nara et al. |
| 2002/0181857 A1* | 12/2002 | Komatsu et al. .............. 385/24 |

OTHER PUBLICATIONS

U.S. Appl. No. 09/806,361, filed Jun. 21, 2001, Nara et al.
U.S. Appl. No. 09/986,029, filed Nov. 7, 2001, Ooyama et al.

(Continued)

*Primary Examiner*—Sung H Pak
(74) *Attorney, Agent, or Firm*—Oblon, Spivak, McClelland, Maier & Neustadt, P.C.

(57) ABSTRACT

An arrayed waveguide grating optical multiplexer/demultiplexer 10 of the present invention 10 comprises one arrayed waveguide grating (AWG) 20 having two input waveguides 21, 22 and two output waveguide-groups 23, 24, and a Mach Zehnder Interferometer-type interleaver 30 integrated with the AWG 20. Each of the input waveguides 21, 22 is formed by a Mach Zehnder Interferometer having the same free spectral range as the frequency spacing of the AWG. The Interferometer includes a 3 dB coupler 51 connected to the 3 dB coupler 32, a 100% coupler 52, a waveguide delay line 53 with an optical path length difference ΔL of 4.1 mm formed between the couplers 51, 52, and a phase shifter 54 of π formed between the 100% coupler 52 and a 3 dB coupler 55 connected to the first slab waveguide 25.

8 Claims, 6 Drawing Sheets

OTHER PUBLICATIONS

U.S. Appl. No. 10/058,085, filed Jan. 29, 2002, Nara et al.

U.S. Appl. No. 11/844,762, filed Aug. 24, 2007, Nara.

Mikitaka Itoh, et al., "Design parameter dependence of chromatic dispersion in silica-based AWG", Institute of Electronics, Information and Communication Engineers, Society Conferences, 2002, p. 161.

M. Abe, et al., "MZI and AWG integrated multi/demultiplexer with photosensitive wavelenght tuning", Institute of Electronics, Information and Communication Engineers, Society Conferences, 2000, p. 135.

K. Okamoto, et al., "Flat spectral response arrayed-waveguide grating multiplexer with parabolic waveguide horns", Electronics Letters, vol. 32, No. 18, Aug. 29, 1996, pp. 1661-1662.

M. Oguma, et al., "Passband-Width Broadening Design for WDM Filter With Lattice-Form Interleave Filter and Arrayed-Waveguide Gratings", IEEE Photonics Technology Letters, vol. 14, No. 3, Mar. 2002, pp. 328-330.

U.S. Appl. No. 12/041,231, filed Mar. 3, 2008, Hasegawa et al.

U.S. Appl. No. 12/056,892, filed Mar. 27, 2008, Nara.

* cited by examiner

ARRAYED WAVEGUIDE GRATING OPTICAL MULTIPLEXER/DEMULTIPLEXER

BACKGROUND OF THE INVENTION

1. Technical Field

The present invention relates to an arrayed waveguide grating optical multiplexer/demultiplexer having an arrayed waveguide grating fabricated on a planar lightwave circuit (PLC).

2. Related Arts

In the case of fabricating an arrayed waveguide grating (AWG) with a narrow frequency spacing (channel spacing), chromatic dispersion increases because of phase error which occurs in the arrayed waveguides of the AWG, in the fabricating process thereof. Since the increase of chromatic dispersion is in inverse proportion to almost $\Delta f^2$, giving the frequency spacing $\Delta f$, for example, 25 GHz frequency spacing AWG has sixteen times chromatic dispersion as large as 100 GHz frequency spacing AWG has (referring to reference (1)).

Therefore, for example, a device fabricated by integrating a MZI (Mach Zehnder Interferometer)-type 25 GHz/50 GHz interleaver and two AWGs of 25 GHz frequency spacing on a chip, has been proposed. The MZI-type interleaver divides one WDM (Wavelength Division Multiplexing) light signal spaced 25 GHz into two groups of even- and odd-numbered channels respectively spaced 50 GHz (referring to reference (2)).

On the other hand, a flattening technology for broadening the passband width of an AWG is important. The flattening technology has been used in the field of communication. It has been known that in the case of flattening the passband width of an AWG, the transmission loss of the AWG increases in principle (referring to reference (3)).

Therefore, in order to decrease the transmission loss of an AWG and flattening the passband width thereof, a design integrated a two-stage lattice-form interleave filer and two AWGs on a tip, has been proposed (referring to reference (4)).

REFERENCES (1) Institute of Electronics, Information and Communication Engineers, Society Conferences C-3-6-61, 2002
(2) Institute of Electronics, Information and Communication Engineers, Society Conferences C-3-6-10, 2000
(3) K. Okamoto, et al, "Flat spectrum response arrayed waveguide grating multiplexer with parabolic horns", Electron. Lett., Vol. 32, pp. 166-1662, 1996
(4) M. Oguma. et al, "Passband-width broadening design for WDM filter with lattice-form interleave filter and arrayed-waveguide gratings", Photonics Technol. Lett., Vol. 14, no. 3, pp. 328-330, 2002

However, in the prior art disclosed in the above reference (4)), because of using a two-stage lattice-form as a MZI-type interleave filer (interleaver), chromatic dispersion increases in principle.

Moreover, there is a common problem for the prior arts disclosed in the above reference (1) and (2) that it needs to connect two AWGs with the output port of a MZI-type interleaver. Because, in the case that each center wavelength of the two AWGs does not coincide accurately with the center wavelength of each light output from the two output ports of the MZI-type interleaver, the spectral characteristic becomes worse.

As described above, various devices have been proposed for low chromatic dispersion, low loss and a flat passband width (a flat transmission spectrum), there was not any compact arrayed waveguide grating optical multiplexer/demultiplexer with a narrow frequency spacing which satisfies all of low chromatic dispersion, low loss and transmission flatness.

BRIEF SUMMARY OF THE INVENTION

The present invention has an object to provide a compact arrayed waveguide grating optical multiplexer/demultiplexer with a narrow frequency spacing, having low chromatic dispersion, low loss and a flat transmission spectrum.

An arrayed waveguide grating optical multiplexer/demultiplexer according to a first aspect of the present invention comprises one arrayed waveguide grating having two input waveguides and two output waveguide-groups, and a waveguide-type interleaver integrated with said one arrayed waveguide grating.

An arrayed waveguide grating optical multiplexer/demultiplexer according to a second aspect of the present invention is an arrayed waveguide grating optical multiplexer/demultiplexer in which said waveguide-type interleaver is a Mach Zehnder Interferometer-type interleaver including at least one Mach Zehnder Interferometer.

An arrayed waveguide grating optical multiplexer/demultiplexer according to a third aspect of the present invention is an arrayed waveguide grating optical multiplexer/demultiplexer in which the arrayed waveguide grating optical multiplexer/demultiplexer has a circuit configuration in which one of said two output waveguide-groups outputs a plurality of light signals, each being spaced by half of the frequency spacing of said arrayed waveguide grating from each light signals output from the other of said two output waveguide-group.

An arrayed waveguide grating optical multiplexer/demultiplexer according to a fourth aspect of the present invention is an arrayed waveguide grating optical multiplexer/demultiplexer in which the arrayed waveguide grating optical multiplexer/demultiplexer has a circuit configuration in which one of said two first input waveguides inputs one WDM light signal having a plurality of light signals to said arrayed waveguide grating, each of the light signals being spaced by half of the frequency spacing of said arrayed waveguide grating, respectively from each of a plurality of light signals of another WDM light signal input from the other input waveguide.

An arrayed waveguide grating optical multiplexer/demultiplexer according to a fifth aspect of the present invention is an arrayed waveguide grating optical multiplexer/demultiplexer in which each of said two input waveguides of said one arrayed waveguide grating is respectively formed by a Mach Zehnder Interferometer having the same free spectral range as the frequency spacing of said one arrayed waveguide grating.

An arrayed waveguide grating optical multiplexer/demultiplexer according to a sixth aspect of the present invention is an arrayed waveguide grating optical multiplexer/demultiplexer in which said Mach Zehnder Interferometer-type interleaver has two output ports, these two output ports are connected respectively to two input waveguides, and the Mach Zehnder Interferometer-type interleaver is configured to have a demultiplexing function which divides one WDM light signal of n-channels into two groups of even- and odd-numbered channels each having two times frequency spacing of said one WDM light signal, and a multiplexing function which combines said two groups of even- and odd-numbered channels into said one WDM light signal of n-channels.

An arrayed waveguide grating optical multiplexer/demultiplexer according to a seventh aspect of the present invention is an arrayed waveguide grating optical multiplexer/demultiplexer in which said Mach Zehnder Interferometer respectively forming said two input waveguides includes a 3 dB coupler connected to the 3 dB coupler of said Mach Zehnder Interferometer-type interleaver, a 100% coupler, a waveguide delay line formed between the 3 dB coupler and the 100% coupler, and a phase shifter of π formed between the 100% coupler and a 3 dB coupler connected to a slab waveguide of said one arrayed waveguide grating, respectively.

An arrayed waveguide grating optical multiplexer/demultiplexer according to a eighth aspect of the present invention comprises a Mach Zehnder Interferometer-type interleaver having a demultiplexing function which divides one WDM light signal of n-channels into two groups of even- and odd-numbered channels each having two times frequency spacing of said WDM light signal, and a multiplexing function which combines the two groups of even- and odd-numbered channels into one WDM light signal of n-channels, and one arrayed waveguide grating having two input waveguides of a first input waveguide and a second input waveguide, and two output waveguide-groups of a first output waveguide-group and a second output waveguide-group, wherein said first and second input waveguides are connected to said Mach Zehnder Interferometer-type interleaver.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

Embodiments of the present invention will be described below.

Figure 1:
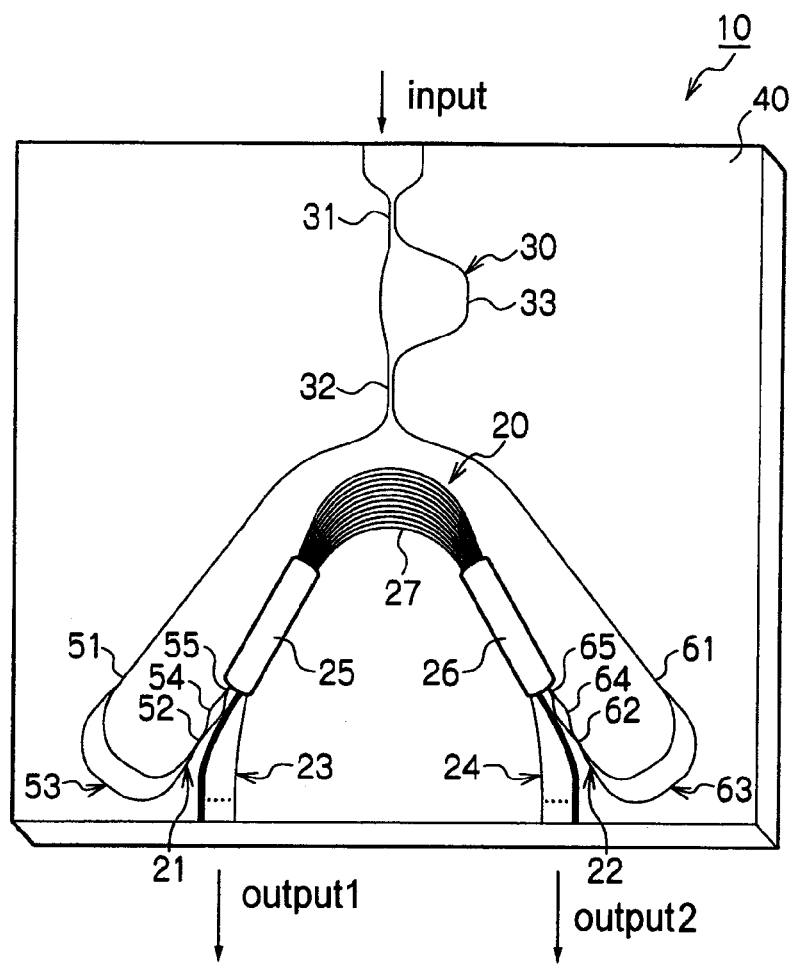
FIG. 1 is a schematic view showing an arrayed waveguide grating optical multiplexer/demultiplexer according to an embodiment of the present invention.

FIG. 1 shows an arrayed waveguide grating optical multiplexer/demultiplexer 10 according to an embodiment of the present invention. The arrayed waveguide grating optical multiplexer/demultiplexer 10 comprises one arrayed waveguide grating (AWG) 20 having two input waveguides 21, 22 and two output waveguide-groups 23, 24, and a Mach Zehnder Interferometer (MZI)-type interleaver 30 integrated with the AWG 20. The MZI-type interleaver 30 one example of a waveguide-type interleaver The AWG 20 has a first input waveguide 21, a first output waveguide-group 23, a first slab waveguide 25 connected to the first input waveguide 21 and the first output waveguide-group 23, a second input waveguide 22, a second output waveguide-group 24, a second slab waveguide 26 connected to the second input waveguide 22 and the second output waveguide-group 24, and an arrayed waveguide 27 connected between the slab waveguides 25, 26. The arrayed waveguide 27 comprises of a plurality of waveguides which are disposed side by side with a predetermined optical path length difference.

The arrayed waveguide grating optical multiplexer/demultiplexer 10 having the AWG 20 and the MZI-type interleaver 30 is fabricated on a planar lightwave circuit (PLC) using a silica substrate 40, by employing an optical fiber manufacturing technology and a semiconductor micro processing technology.

The arrayed waveguide grating optical multiplexer/demultiplexer 10 has a circuit configuration in which one of the first and second output waveguide-groups 23, 24 outputs a plurality of light signals (λ1, λ3, λ5, ... λ2n−1) each being spaced by half (25 GHz) of the frequency spacing (for example 50 GHz) of the AWG 20, respectively from each of lights (λ2, λ4, λ6, ... λ2n) being output from the other output waveguide-group.

And, the arrayed waveguide grating optical multiplexer/demultiplexer 10 has a circuit configuration in which one of the first and second input waveguides 21, 22 inputs one WDM light signal having a plurality of light signals (λ1, λ3, λ5, ... λ2n−1) to the AWG 20, each of the light signals being spaced by half (25 GHz) of the frequency spacing (for example 50 GHz) of the AWG 20, respectively from each of a plurality of light signals (λ2, λ4, λ6, ... λ2n) of another WDM light signal being input from the other input waveguide.

To realize the arrayed waveguide grating optical multiplexer/demultiplexer 10 having the above described circuit configuration, two output ports of the MZI-type interleaver 30 are connected to two input waveguides 21, 22 respectively. And, the MZI-type interleaver 30 is configured to have a demultiplexing function which divides one WDM light signal of n-channels into two groups of even- and odd-numbered channels each having two times frequency spacing of the WDM light signal, and a multiplexing function which combines the two groups of even- and odd-numbered channels into one WDM light signal of n-channels.

For example, the MZI-type interleaver 30 is a 25 GHz/50 GHz interleaver which divides one WDM light signal of n-channels each spaced 25 GHz into two groups of even- and odd-numbered channels respectively spaced 50 GHz. The MZI-type interleaver 30 includes two 3 dB couplers 31, 32, and a waveguide delay line 33 with an optical path length difference (ΔL) of 4.1 mm formed between two 3 dB couplers 31, 32.

The AWG 20 is an arrayed waveguide grating with 50 GHz frequency spacing and 32-channels. Each of the two input waveguides 21, 22 of the AWG 20 is respectively formed by a Mach Zehnder Interferometer having the same free spectral range (FSR) as the frequency spacing (50 GHz) of the AWG.

Figure 2:
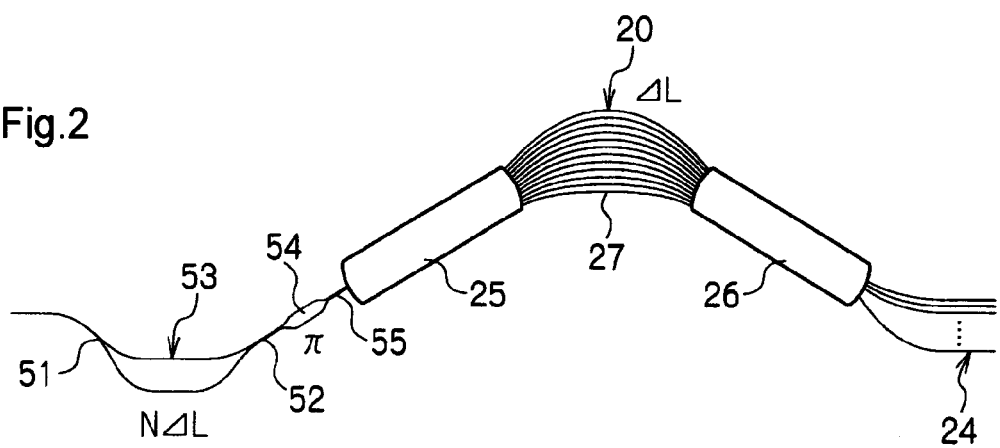
FIG. 2 is an enlarged plain view showing an arrayed waveguide grating of an arrayed waveguide grating optical multiplexer/demultiplexer.

As shown in FIG. 1 and FIG. 2, the Mach Zehnder Interferometer forming the first input waveguide 21 includes a 3 dB coupler 51 connected to one of the two output ports of the 3 dB coupler 32 of the MZI-type interleaver 30, a 100% coupler 52, a waveguide delay line 53 with an optical path length difference (ΔL) of 4.1 mm formed between the two couplers 51, 52, and a phase shifter 54 of π formed between the 100% coupler 52 and a 3 dB coupler 55 connected to the first slab waveguide 25 of the AWG 20.

And, the Mach Zehnder Interferometer forming the second input waveguide 22 includes a 3 dB coupler 61 connected to the other output port of the 3 dB coupler 32 of the MZI-type interleaver 30, a 100% coupler 62, and a waveguide delay line 63 with an optical path length difference (ΔL) of 4.1 mm formed between the two couplers 51, 52, a phase shifter 54 of π formed between the 100% coupler 62 and a 3 dB coupler 65 connected to the second slab waveguide 26 of the AWG 20.

As described above, the arrayed waveguide grating optical multiplexer/demultiplexer 10 includes the MZI-type interleaver 30 having a demultiplexing function which divides one WDM light signal of n-channels into two groups of even- and odd-numbered channels each having two times frequency spacing of the WDM light signal, and a multiplexing function which combines the two groups of even- and odd-numbered channels into one WDM light signal of n-channels.

And, the arrayed waveguide grating optical multiplexer/demultiplexer 10 includes the AWG 20 having two input waveguides 21, 22 each formed by the Mach Zehnder Interferometer and two output waveguide-groups 23, 24. The first input waveguide 21 and the second input waveguide 22 are connected to the MZI-type interleaver 30.

In the description hereinafter, the MZI-type interleaver 30 is called a MZI 30, and the AWG 20 in which each of the two input waveguide 21, 22 is formed by the above Mach Zehnder Interferometer is called a MZI-AWG 20.

In the arrayed waveguide grating optical multiplexer/demultiplexer 10, when a WDM light signal having a plurality of light signals (λ1, λ2, λ3, ... λn) is input to an input port connected to the 3 dB coupler 31, the WDM light signal is divided by the MZI 30 into two groups of even- and odd-numbered channels each having two times frequency spacing of the WDM light signal.

One of the two groups of even- and odd-numbered channels is for example one WDM light signal of the group of odd-numbered channels having a plurality of light signals (λ1, λ3, λ5, ... λ2n−1). The other of the two groups of even- and odd-numbered channels is for example another WDM light signal of the group of even-numbered channels having a plurality of light signals (λ2, λ4, λ6, ... λ2n).

The one WDM light signal of the group of odd-numbered channels propagates in the 3 dB coupler 51, the waveguide delay line 53, the 100% coupler 52, the phase shifter 54, the 3 dB coupler 55 and the first input waveguide 21, and is input to the first slab waveguide 25 of the MZI-AWG 20. On the other hand, the another WDM light signal of the group of even-numbered channels propagates in the 3 dB coupler 61, the waveguide delay line 63, the 100% coupler 62, the phase shifter 64, the 3 dB coupler 65 and the second input waveguide 22, and is input to the second slab waveguide 26 of the MZI-AWG 20.

The one WDM light signal being input to the first slab waveguide 25 is divided by the MZI-AWG 20 into a plurality of light signals (λ2, λ4, λ6, ... λ2n). Each of these divided light signals (output 2) are output from each of the second output waveguide-group 24. On the other hand, the another WDM light signal being input to the second slab waveguide 26 is divided by the MZI-AWG 20 into a plurality of light signals (λ1, λ2, λ3, ... λn). Each of these divided light signals (output 1) are output from each of the first output waveguide-group 23.]

On the other hand, when a plurality of light signals (λ1, λ2, λ3, ... λn) are input to each of the first output waveguide-group 23, the light signals are combined by the MZI-AWG 20 into one WDM light signal of the group of odd-numbered channels. The one WDM light signal propagates from the second input waveguide 22 to one of the two output ports of the MZI 30. And, when a plurality of light signals (λ2, λ4, λ6, ... λ2n) are input to each of the second output waveguide-group 24, the light signals are combined by the MZI-AWG 20 into another WDM light signal of the group of even-numbered channels. The WDM light signal propagates from the first input waveguide 21 to the other of the two output ports of the MZI 30.

And, the one WDM light signal of the group of odd-numbered channels and the another WDM light signal of the group of even-numbered channels are combined by the MZI 30 into a WDM light signal having a plurality of light signals (λ1, λ2, λ3, ... λn). The WDM light signal having a plurality of light signals (λ1, λ2, λ3 ... λn) is output from the input port connected to the 3 dB coupler 31.

According to an embodiment of the present invention, it is possible to realize the arrayed waveguide grating optical multiplexer/demultiplexer 10 using one arrayed waveguide grating (MZI-AWG) 20 connected to the MZI-type interleaver 30 (MZI 30). That is, it does not need to connect two AWGs with a MZI-type interleaver. Therefore, it is not necessary to control the relative center wavelength of the two AWGs and it is possible to fabricate a compact arrayed waveguide grating optical multiplexer/demultiplexer.

Further, according to an embodiment of the present invention, each of the two input waveguides 21, 22 of the MZI-AWG 20 is respectively formed by a Mach Zehnder Interferometer having the same free spectral range (FSR) as the frequency spacing (50 GHz) of the AWG, so that chromatic dispersion does not almost occur in principle.

Figure 3:
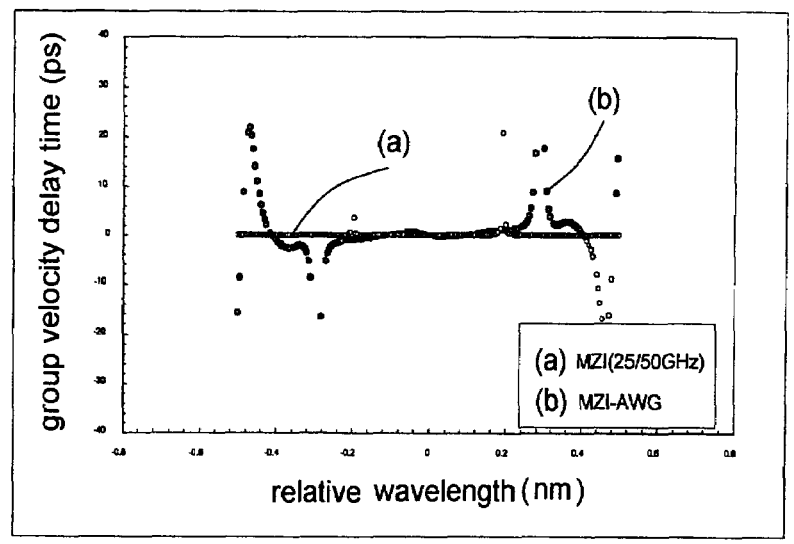
FIG. 3 is a graph showing calculated results for each chromatic dispersion of a MZI-type interleaver and an arrayed waveguide grating (MZI-AWG) of an arrayed waveguide grating optical multiplexer/demultiplexer.
Figure 4:
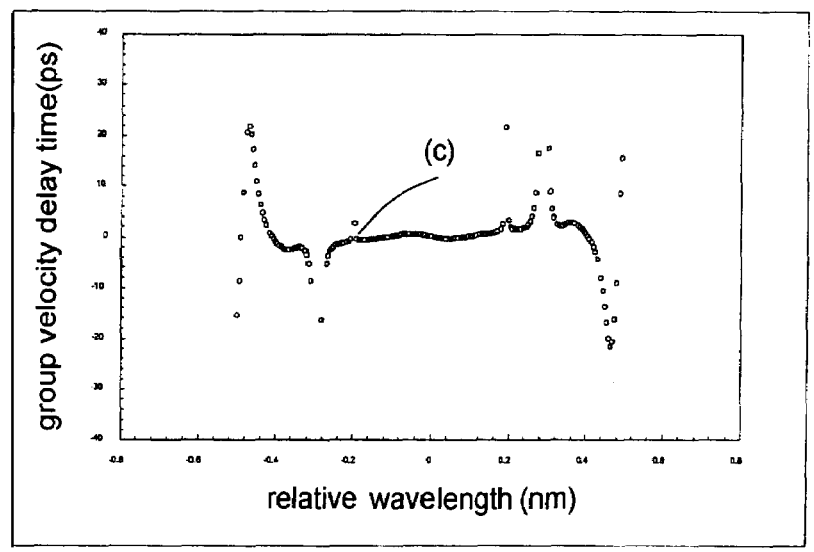
FIG. 4 is a graph showing calculated results for total chromatic dispersion of an arrayed waveguide grating optical multiplexer/demultiplexer.

Still further, according to an embodiment of the present invention, since chromatic dispersion does not almost occur in the MZI 30 in principle, when a WDM light signal propagates the MZI 30 and the MZI-AWG 20, chromatic dispersion does not almost occur. The result is shown in FIG. 3 and FIG. 4. In FIG. 3, a curve (a) shows calculated results for chromatic dispersion of one of two groups of even- and odd-numbered channels divided by the MZI 30, and a curve (b) shows calculated results for chromatic dispersion when one of two groups of even- and odd-numbered channels pass the MZI-AWG 20. In FIG. 4, a curve (c) shows calculated results for chromatic dispersion when one of two groups of even- and odd-numbered channels the MZI 30 and the MZI-AWG 20.

Figure 5:
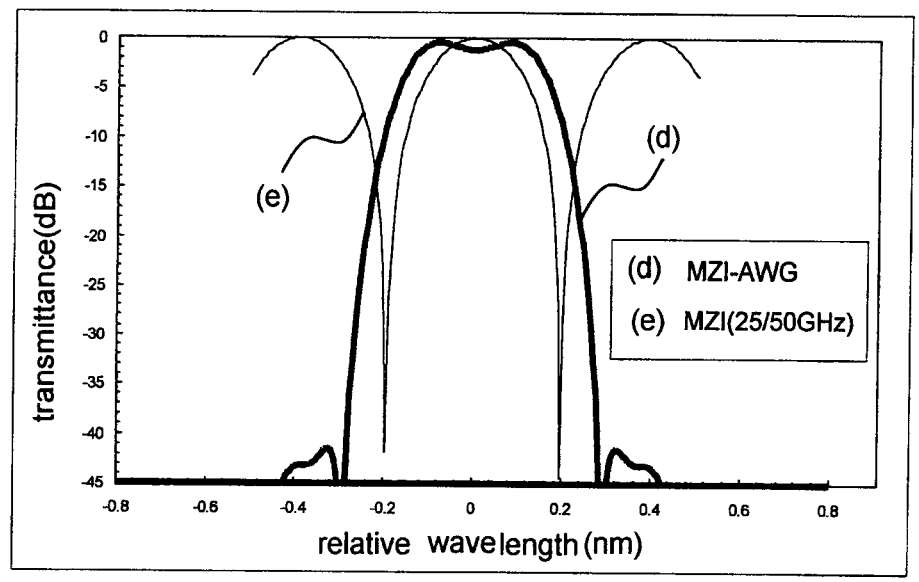
FIG. 5 is a graph showing calculated results for each transmission spectrum of a MZI-type interleaver and an arrayed waveguide grating (MZI-AWG) of an arrayed waveguide grating optical multiplexer/demultiplexer.
Figure 6:
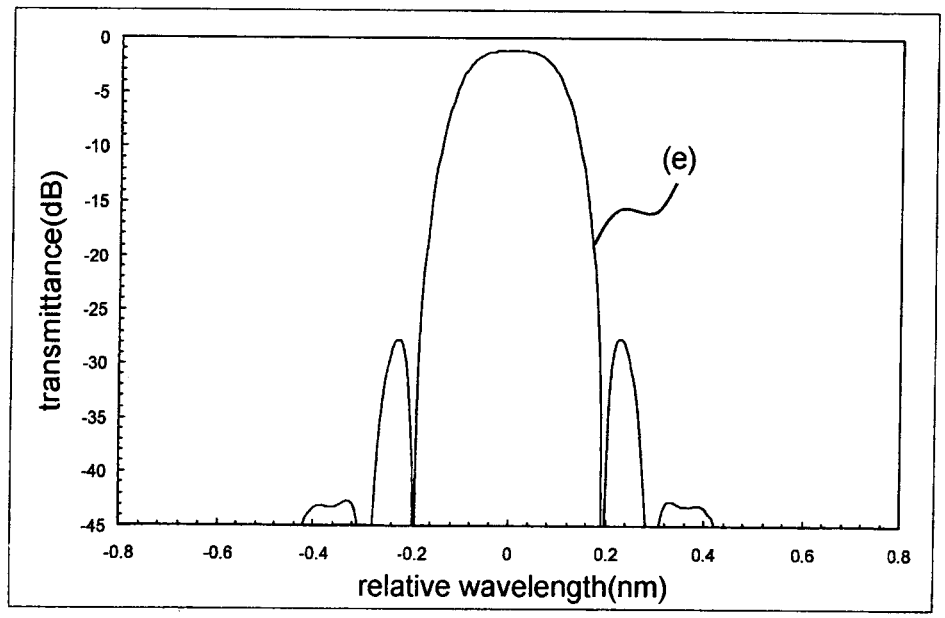
FIG. 6 is a graph showing calculated results for total transmission spectrum of an arrayed waveguide grating optical multiplexer/demultiplexer.

FIG. 5 shows calculated results for each transmission spectrum of the MZI 30 and the MZI-AWG 20. In FIG. 5, a curve (d) shows calculated results for transmission spectrum of the MZI-AWG 20, and a curve (e) shows calculated results for transmission spectrum of the MZI 30. In FIG. 6, a curve (f) shows calculated results for total transmission spectrum of the MZI 30 and the MZI-AWG 20. These results show that chromatic dispersion does not almost occur, and low loss and a flat transmission spectrum are obtained in the arrayed waveguide grating optical multiplexer/demultiplexer according to an embodiment of the present invention. Therefore, it is capable of fabricating a compact arrayed waveguide grating optical multiplexer/demultiplexer with a narrow frequency spacing, having low chromatic dispersion, low loss and a flat transmission spectrum.

Examples of the present invention will be described in detail below.

EXAMPLE

As one example of the arrayed waveguide grating optical multiplexer/demultiplexer 10 described above, we fabricated an arrayed waveguide grating optical multiplexer/demultiplexer of 25 GHz-64 c having the optical circuit configuration as shown in FIG. 1, on a silica-based planar lightwave circuit of $\Delta=0.8\%$ and T (thickness)=W (width)=6.5 μm, by using a Flame Hydrolysis Deposition (FHD) method and a Reactive Ion Etching (RIE) method.

The MZI-type interleaver (MZI) 30 of 25 GHz/50 GHz was formed to have a waveguide delay line (an asymmetric Mach Zehnder Interferometer) 33 with an optical path length difference ($\Delta L$) of 4.1 mm between two 3 dB couplers 31, 32.

For the MZI-AWG 20, a MZI portion used as each of two input waveguides 21, 22 was formed to include waveguide delay lines 53, 63 with an optical path length difference ($\Delta L$) of 4.1 mm, 100% couplers 52, 62, phase shifters 54, 64 and 3 dB couplers 55, 65, disposed respectively after 3 dB couplers 51, 61.

Further, the MZI-AWG 20 was formed to give the focus length LF of each of two slab waveguides 25, 26 LF=14 mm and the optical path length difference $\Delta L$ of the arrayed waveguide 27 $\Delta L$=79 μm.

Figure 7:
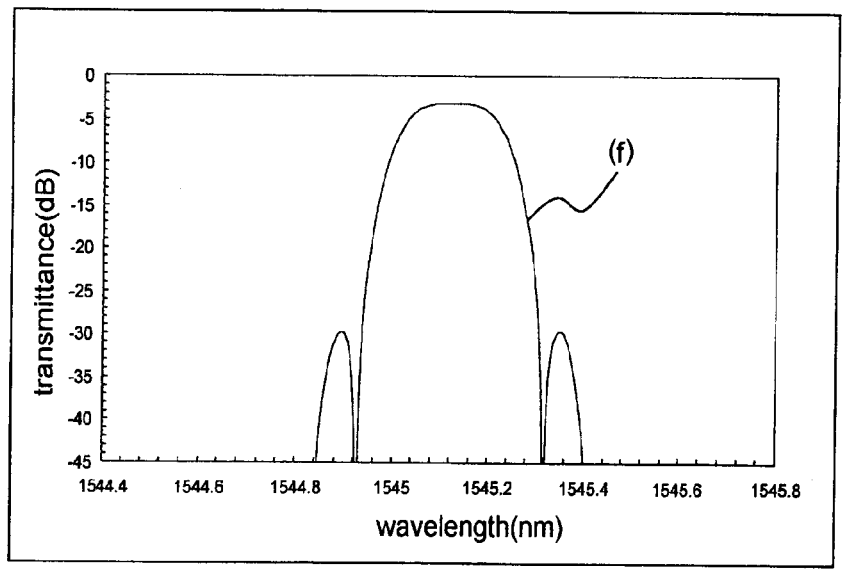
FIG. 7 shows a graph showing calculated results for total transmission spectrum of an arrayed waveguide grating optical multiplexer/demultiplexer.
Figure 8:
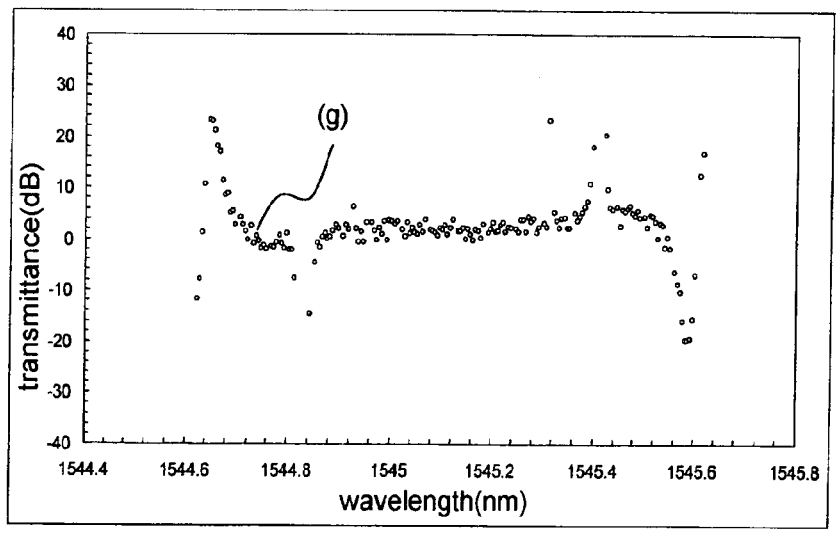
FIG. 8 is a graph showing measured results for total chromatic dispersion of an arrayed waveguide grating optical multiplexer/demultiplexer.

The calculated results for total transmission spectrum of the arrayed waveguide grating optical multiplexer/demultiplexer 10 according to the present example is shown by a curve (f) in FIG. 7 and the measured results for chromatic dispersion thereof is shown by a curve (g) in FIG. 8.

As described above, the arrayed waveguide grating optical multiplexer/demultiplexer 10 of the present example is an arrayed waveguide grating optical multiplexer/demultiplexer of 25 GHz-64 c. In this arrayed waveguide grating optical multiplexer/demultiplexer, the MZI-type interleaver (MZI) 30 is an arrayed waveguide grating optical multiplexer/demultiplexer of 25 GHz/50 GHz which includes a waveguide delay line 33 with an optical path length difference ($\Delta L$) of 4.1 mm formed between two 3 dB couplers 31, 32. And, in this arrayed waveguide grating optical multiplexer/demultiplexer 10, the MZI-AWG 20 is an arrayed waveguide grating with 50 GHz frequency spacing and 32-channel count (32-channels).

The present invention is not limited to the above described embodiments and various and modifications may be possible without departing from the scope of the present invention.

For example, in the portion of the MZI-AWG 20 of the above embodiment, by changing a taper width between each of the slab waveguides 25, 26 and each of the output waveguide-groups 23, 24, it is easy to control the dipping quantity of spectrum without changing chromatic dispersion and increasing crosstalk. FIG. 8 shows the chromatic dispersion characteristic of the arrayed waveguide grating optical multiplexer/demultiplexer having thus constitution.

Figure 9:
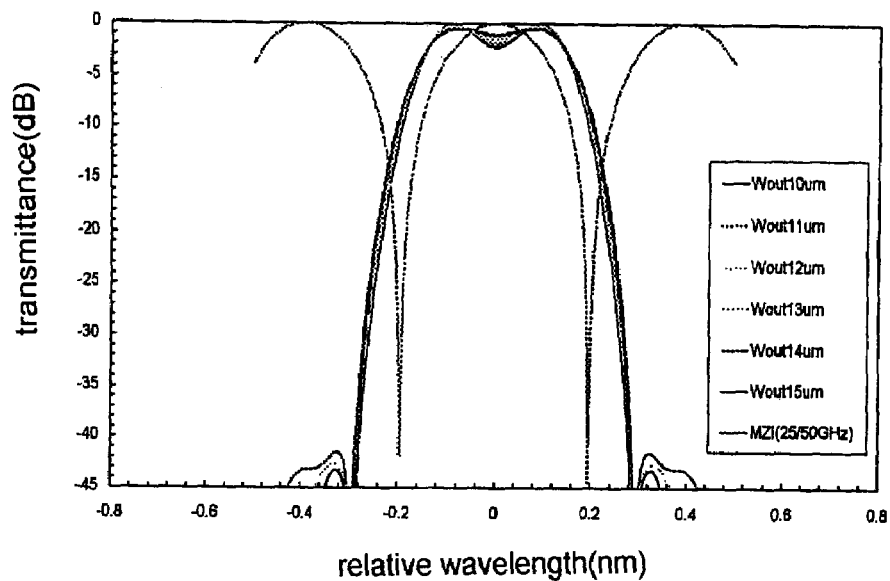
FIG. 9 is a graph showing calculated results for transmission spectrum of a MZI-type interleaver and calculated results for transmission spectrum of six light signals which have different wavelength in the range of 10 um~15 um, in the arrayed waveguide grating optical multiplexer/demultiplexer with 25 GHZ frequency spacing and 64-channels.

FIG. 9 shows calculated results for transmission spectrum of a MZI-type interleaver of an arrayed waveguide grating optical multiplexer/demultiplexer with 25 GHZ frequency spacing and 64-channels, and calculated results for transmission spectrum of six light signals which have different wavelength in the range of 10 um to 15 um.

Figure 10:
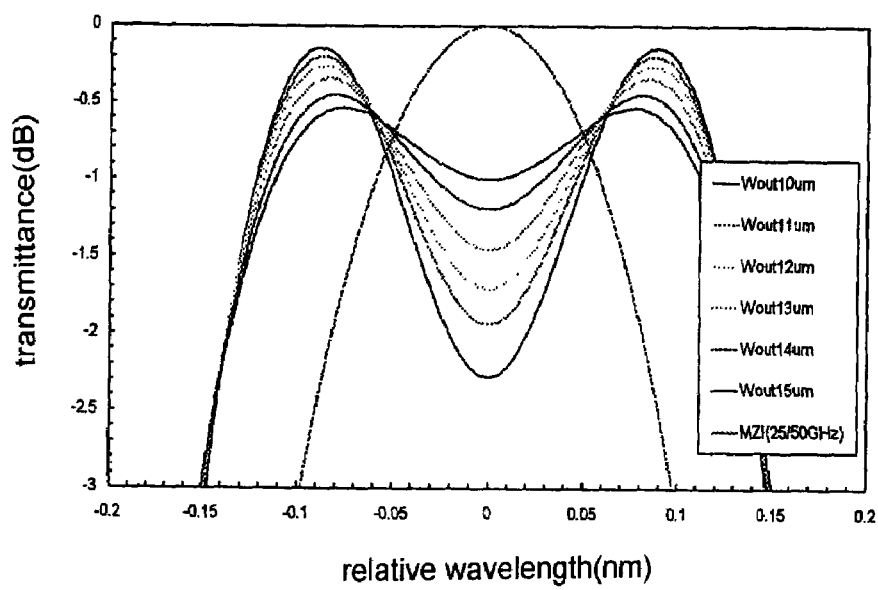
FIG. 10 is an enlarged graph showing one portion of the graph showed in FIG. 1.

FIG. 10 is a graph enlarged one portion of the graph showed in FIG. 9.

Figure 11:
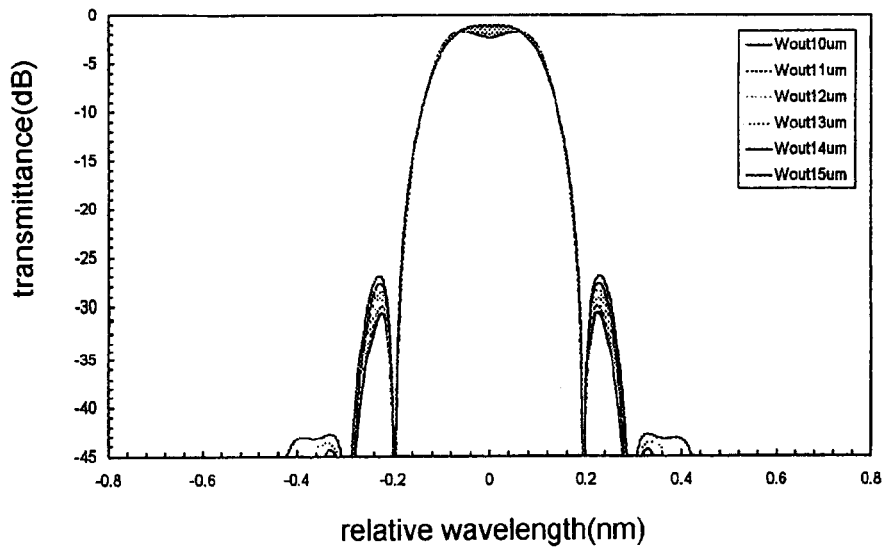
FIG. 11 is a graph showing calculated results for transmission spectrum of six light signals which have different wavelength in the range of 10 um~15 um, in the arrayed waveguide grating optical multiplexer/demultiplexer with 25 GHZ frequency spacing and 64-channels.

FIG. 11 is a graph showing calculated results for transmission spectrum of six light signals which have different wavelength in the range of 10 um~15 um, in the arrayed waveguide grating optical multiplexer/demultiplexer with 25 GHZ frequency spacing and 64-channels.

Figure 12:
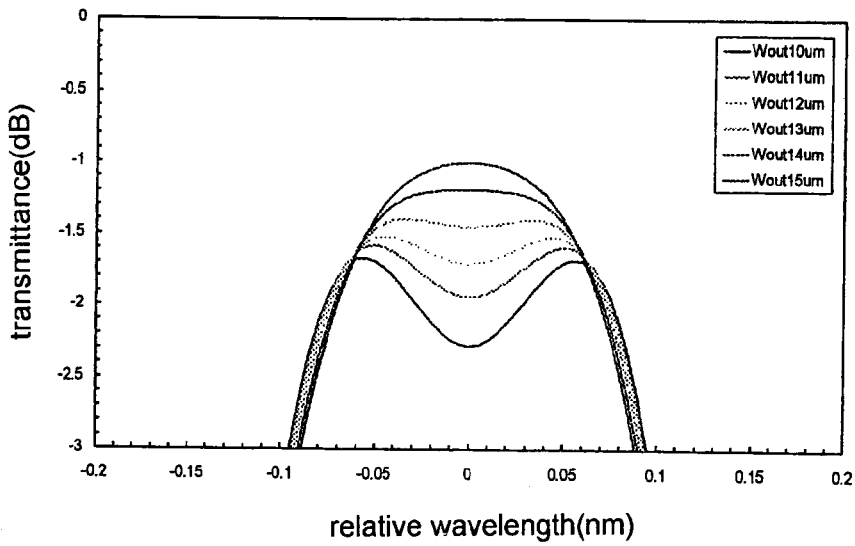
FIG. 12 is an enlarged graph showing one portion of the graph showed in FIG. 11.

FIG. 12 is a graph enlarged one portion of the graph showed in FIG. 11.

According to the present invention, it is able to fabricate a compact arrayed waveguide grating optical multiplexer/demultiplexer with a narrow frequency spacing, having low chromatic dispersion, low loss and a flat transmission spectrum.

The present invention is not limited to the above described embodiments and various and modifications may be possible without departing from the scope of the present invention.

This application is based on the Japanese Patent application No. 2006-234969 filed on Aug. 31, 2006, entire content of which is expressly incorporated by reference herein.

What is claimed is:

1. An arrayed waveguide grating optical multiplexer/demultiplexer, comprising:
   one arrayed waveguide grating having two input waveguides, two output waveguide-groups, a first slab waveguide connected to one of said two input waveguides and one of said two output waveguide-groups, a second slab waveguide connected to the other of said two input waveguides and the other of said two output waveguide-groups, and an arrayed waveguide connected between the first slab waveguide and the second slab waveguide; and
   a waveguide type interleaver having two output pods which are connected to said two input waveguides, respectively.

2. The arrayed waveguide grating optical multiplexer/demultiplexer according to claim 1, wherein said waveguide-type interleaver is a Mach Zehnder Interferometer-type interleaver including at least one Mach Zehnder Interferometer.

3. The arrayed waveguide grating optical multiplexer/demultiplexer according to claim 1, wherein the arrayed waveguide grating optical multiplexer/demultiplexer has a circuit configuration in which one of said two output waveguide-groups outputs a plurality of light signals each being spaced by half of the frequency spacing of said arrayed waveguide grating from each light signals output from the other of said two output waveguide-group.

4. The arrayed waveguide grating optical multiplexer/demultiplexer according to claim 1, wherein the arrayed waveguide grating optical multiplexer/demultiplexer has a circuit configuration in which one of said two first input waveguides inputs one WDM light signal having a plurality of light signals to said arrayed waveguide grating, each of the light signals being spaced by half of the frequency spacing of said arrayed waveguide grating, respectively from each of a plurality of light signals of another WDM light signal being input from the other input waveguide.

5. The arrayed waveguide grating optical multiplexer/demultiplexer according to claim 1, wherein each of said two input waveguides of said one arrayed waveguide grating is respectively formed by a Mach Zehnder Interferometer having the same free spectral range (FSR) as the frequency spacing of said one arrayed waveguide grating.

6. The arrayed waveguide grating optical multiplexer/demultiplexer according to claim 2, wherein said Mach Zehnder Interferometer-type interleaver has two output ports, these two output ports are connected respectively to two input waveguides, and the Mach Zehnder Interferometer-type interleaver is configured to have a demultiplexing function which divides one WDM light signal of n-channels into two groups of even- and odd-numbered channels each having two times frequency spacing of said one WDM light signal, and a multiplexing function which combines said two groups of even- and odd- numbered channels into said one WDM light signal of n-channels.

7. The arrayed waveguide grating optical multiplexer/demultiplexer according to claim 5, wherein said Mach Zehnder Interferometer respectively forming said two input waveguides includes a first 3 dB coupler connected to a second 3 dB coupler of said waveguide-type interleaver, a 100% coupler, a waveguide delay line formed between the first 3 dB coupler and the 100% coupler, and a phase shifter of $\pi$ formed between the 100% coupler and a 3 dB coupler connected to a slab waveguide of said one arrayed waveguide grating, respectively.

8. An arrayed waveguide grating optical multiplexer/demultiplexer comprising:
   a Mach Zehnder Interferometer-type interleaver having a demultiplexing function which divides one WDM light signal of n-channels into two groups of even- and odd-numbered channels each having two times frequency spacing of said WDM light signal, and a multiplexing function which combines the two groups of even- and odd-numbered channels into one WDM light signal of n-channels; and
   one arrayed waveguide grating having two input waveguides of a first input waveguide and a second input waveguide, and two output waveguide-groups of a first output waveguide-group and a second output waveguide-group, wherein
   said first and second input waveguides are connected to said Mach Zehnder Interferometer-type interleaver.

* * * * *